Dec. 20, 1927.
W. J. DUNHAM ET AL
1,653,349
TILLAGE IMPLEMENT
Filed Jan. 20, 1923
2 Sheets-Sheet 1
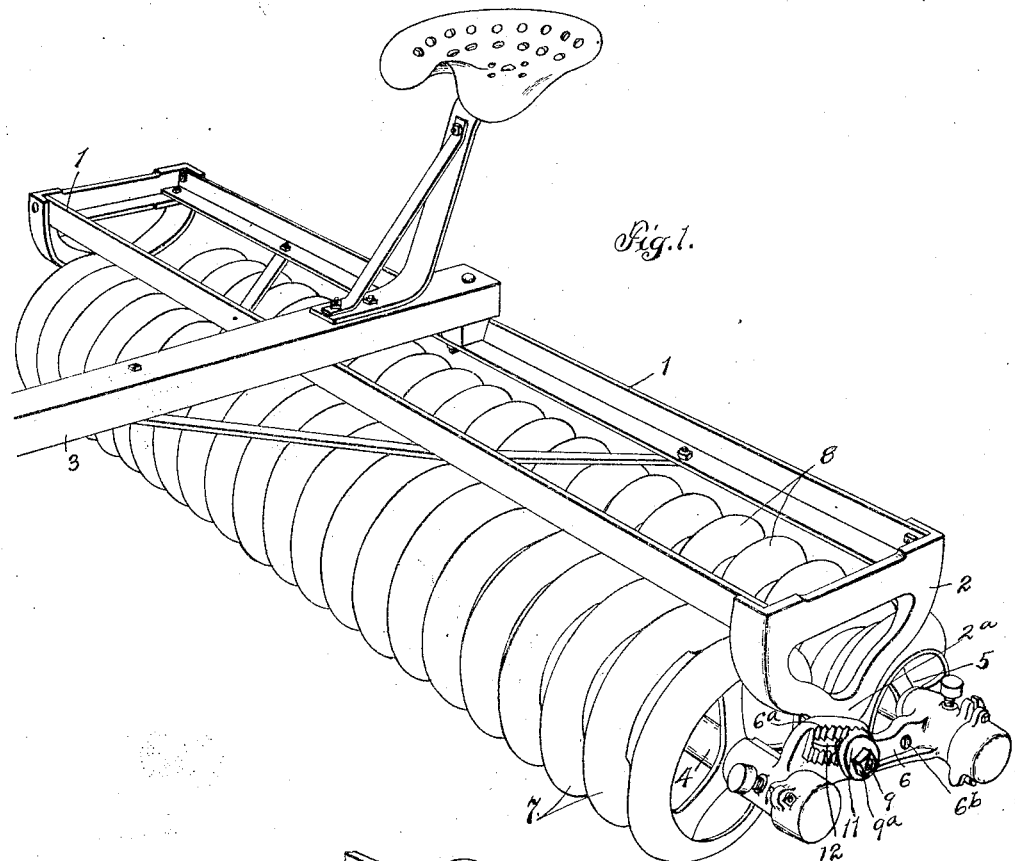
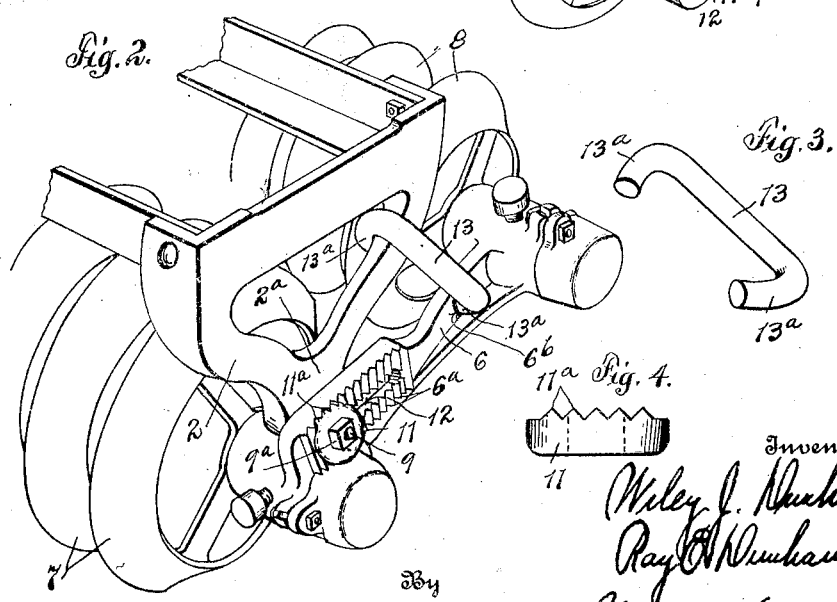

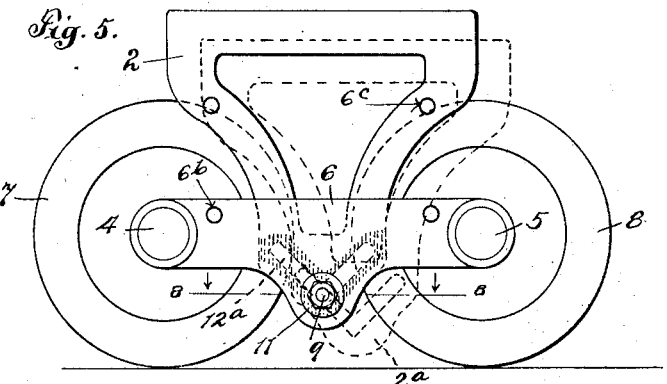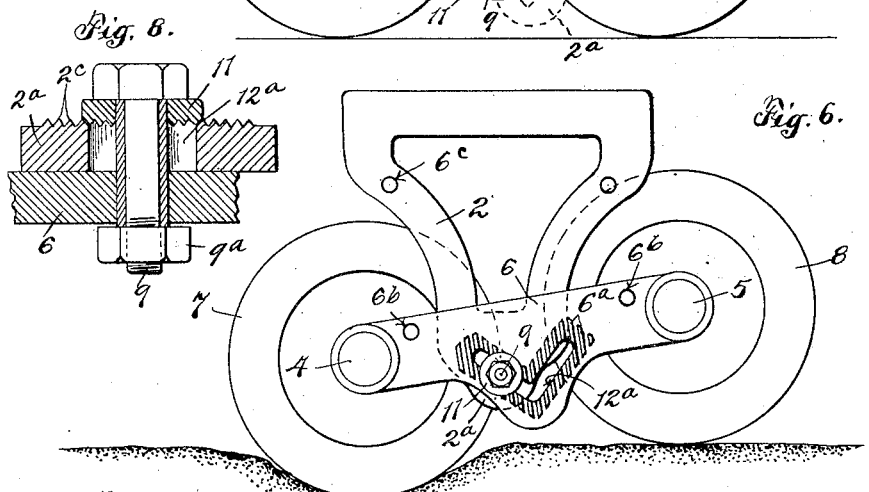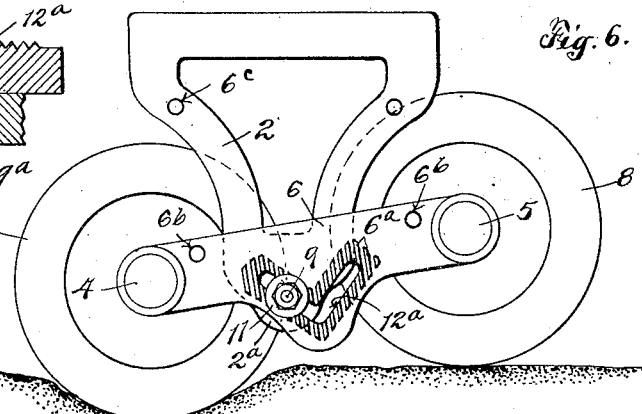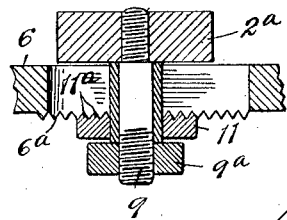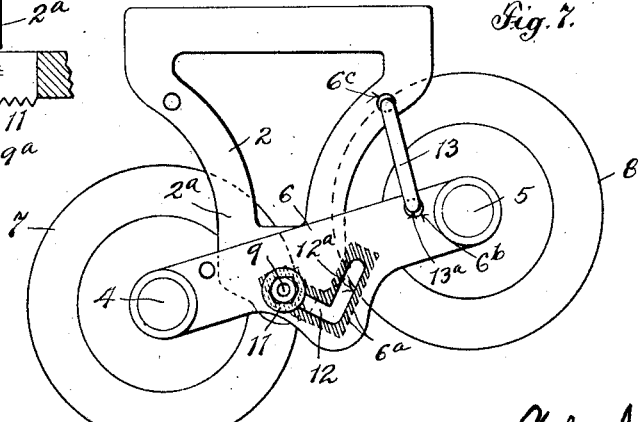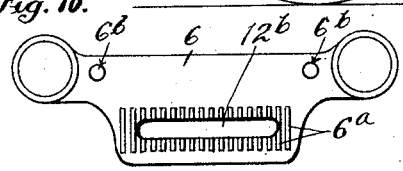

Patented Dec. 20, 1927.

1,653,349

UNITED STATES PATENT OFFICE.

WILEY J. DUNHAM AND RAY E. DUNHAM, OF BEREA, OHIO, ASSIGNORS TO THE DUNHAM COMPANY, OF BEREA, OHIO, A CORPORATION OF OHIO.

TILLAGE IMPLEMENT.

Application filed January 20, 1923. Serial No. 613,837.

This invention relates to improvements in tillage or earth working implements, and more particularly to that class or type commonly known as "packers and mulchers", such as disclosed, for example,—in the Dunham reissued Patent No. 13921, of June 1st, 1915, in which are employed a draft frame and an oscillatory or rocking frame, the latter carrying front and rear gangs of packer discs.

As distinguished from the said structure disclosed in the said Dunham reissue patent and in which the points of oscillation or pivotal connections between the draft frame and the oscillatory or rocking frame are in a relatively fixed or constant relation to the draft frame, the primary object of this invention is the provision of means for adjustably connecting and shifting the points of oscillation of the gang frame relatively of said draft frame and in the line of draft to correspondingly shift the superposed weight upon and the draft stresses imparted to the respective disc gangs through the draft frame to conform to and meet the varying demands of actual service occasioned by varying soil conditions.

A still further and very important object is the provision of means for moving one gang of discs out of engagement with the soil whereby the weight and draft stresses are transmitted exclusively to the other disc gang for use as a single gang tillage implement or soil pulverizer.

A still further and very important object is to improve the construction and relative location of the points of oscillation or bearing connections between the draft and gang frames together with improved means for variably shifting and adjusting and securing said connections between said frames and in the longitudinal line of draft.

A still further object is the provision of improved draft and gang frames having their points of oscillation or bearing connections so arranged and disposed relatively as to permit of the use of packer or pulverizer discs of equal diameter on the axle shafts of the disc gangs whereby the latter together with the gang frames may be shifted bodily and longitudinally in the line of draft and with respect to the points of oscillation whereby the superposed weight upon and the draft stresses imparted to the respective disc gangs may either be equally or unequally distributed in accordance with the direction in which the implement is being drawn or the particular soil conditions being met.

A still further object is the provision of a reversible implement of this class admirably adapted for use in preparing the soil or seed beds in greenhouses, and the like, so that the implement may be drawn from one end to the other to and fro without the necessity of making turns at the end by simply reversing or changing the draft tongue or appliance at each end.

There are other features of the invention residing in elemental combinations and particular construction of parts, all as will hereinafter more fully appear.

With the above mentioned and other ends in view, the invention consists in the novel construction, arrangement and combination of parts, hereinafter described, illustrated in some of its embodiments in the accompanying drawings and particularly pointed out in the appended claims.

Referring to the drawings, forming a part of this specification, Figure 1 is a perspective view of a tillage implement of the double disc gang soil pulverizer type constructed in accordance with this invention.

Fig. 2, an enlarged fragmentary perspective view, the draft and gang frames being shifted longitudinally and relatively in the line of draft through the adjustable pivot connections and the rear of the gang frame being lifted up and connected to the draft frame whereby the rear disc gang is thrown out of engagement with the soil and the weight and draft stresses transmitted to the other or front disc gang as a single gang implement.

Fig. 3, a perspective view of one of the frame connecting links, detached.

Fig. 4, an edge or plan view of one of the adjustable pivot caps, detached.

Fig. 5, an end elevation of a modified form embodying a modified form of pivot bearing and pivot adjusting slot and a transposition of the latter to the end bracket of the draft frame, same embodying also a reversible implement with gangs of discs of equal diameter, together with means whereby either disc gang may be elevated or thrown out of operation or the superposed weight and draft stresses imparted to the respective gangs may be either equally or unequally distributed.

Fig. 6, a similar view of another modification in which the gang frame and gangs are shifted bodily and rearwardly longitudinally in the line of draft, and relatively to the draft frame, with the points of oscillation or pivot bearings shifted to an intermediate position in the adjustable slot, placing greater weight upon and imparting more draft stresses to the front disc gangs than the rear.

Fig. 7, a similar view of the same, the parts being shifted to an extreme position and the rear portion of the gang frame being elevated and connected to the draft frame whereby the rear gang is thrown out of operation and the weight and draft stresses imparted solely to the front gang as a single gang implement.

Fig. 8, a horizontal cross sectional view of one form of adjustable pivot connection between the draft and gang frames, taken on line 8—8 of Fig. 5.

Fig. 9, a similar view of the form of adjustable pivot connection shown in the other figures of the drawings.

Fig. 10, a side elevation of an oscillatory gang yoke member embodying a further modified form and location of pivot bearing adjusting slot.

Similar numerals of reference designate like parts throughout all the figures of the drawings.

The improved tillage implement, in the present instance, is in the specific form of a double or tandem gang packer or soil pulverizer. The main implement or draft frame consists, in the present instance, of transverse bars 1, provided at their ends with depending bearing members 2, the latter being, in the present instance, in the specific form of bearing brackets terminating at their lower ends in bearing heads $2^a$. The implement or draft frame is adapted to be connected to and to be drawn by any suitable and convenient draft appliance, as for example,—a centrally located draft bar or tongue 3, as shown in Fig. 1 of the drawings.

As in the former Dunham patent above referred to, there is provided a supplemental or rocking frame carrying two transverse series of discs forming front and rear parallel extending gangs, together with means for connecting said supplemental or rocking frame to the draft frame to permit said supplemental or gang frame to oscillate around a common transverse axis whereby an oscillatory or rocking movement will be permitted so that the front and rear gangs may conform to and meet the varying undulatory contour of the surface being cultivated.

The secondary or rocking frame for carrying the tools or earth working elements comprises mainly the two transverse axes or shafts 4 and 5, and the yoke-like bearing members 6, at the ends which receive and support the ends of the shafts 4 and 5.

In the form shown in Figs. 1 and 2 of the drawings the packer discs 7 constituting, in such instance, the front gang, are larger in diameter than the rear discs 8, and with a view of transmitting the greatest weight and pulling and draft streeses to the front gang of discs 7, in view of such front discs taking the initial and more difficult part of the packing and pulverizing operation, the pivot connections or points of oscillation between the draft and gang or secondary frames are placed nearer the center of the packer discs 7 than the rear packer discs 8, in meeting ordinary soil conditions, and as referred to in the said reissued Dunham patent.

As a means of pivotally connecting the intermediate portions of the oscillatory frame yokes 6 to the bearing heads $2^a$ of the draft frame, the bearing heads $2^a$ of the brackets 2 are provided with suitable openings $2^b$, adapted to receive and contain a suitable bearing element, such, for example, as a bearing bolt 9 surrounded by a suitable bearing sleeve 10, the outer end of the bolt 9 being provided with a nut $9^a$.

As a means of longitudinally shifting the points of oscillation of said secondary frame or yoke members 6 relatively to said draft frame and in the line of draft to correspondingly shift the superposed weight upon and the draft stresses imparted to the said disc gangs through said secondary and draft frames, (and as distinguished from the said Dunham patent where said points of oscillation are relatively fixed or constant) suitable pivot adjusting slots and adjusting members may be provided, said adjusting slots being either formed in the gang frame members or yokes 6, as shown in Figs. 1, 2, 6, 7 and 10 of the drawings, or being formed in the bearing or connecting members of the draft frame, as for example,—the bearing heads $2^a$ of the brackets 2, as shown in Fig. 5 of the drawings.

As a means of adjustably securing the pivot connections between the draft and floating or gang frames whereby such points of oscillation or pivot connections may be secured in any desired position, suitable pivot or bearing caps 11, may be provided, said caps 11 being preferably provided on their under sides with serrations or teeth $11^a$, adapted to fit into and interlock with similar serrations or teeth $6^a$, along adjacent sides or marginal portions of the adjusting slots 12.

As a means of providing a reversible implement to be drawn to and fro by simply reversing the draft attachment, and particularly as a means of connecting the gang frames and gangs to the draft frame whereby either one of the disc gangs may be thrown out of operation and whereby the superposed weight and draft stresses imparted to the respective disc gangs may be either equally or unequally distributed, adjusting slots 12$^a$, of the relative form and location shown in Figs. 5, 6 and 7 of the drawings may be provided. In such instance it will be seen that the points of oscillation of the secondary or rocking gang frame members are placed a considerable distance below the common plane of the disc gang axes (as distinguished from Figs. 1 and 2 and the former Dunham patent referred to where such points are above such plane) and it will therefore be apparent that the line of pull or draft will extend in a line from said point of oscillation or pivot connections either below or through the axial plane of the front axes with respect to the line of draft and correspondingly changing the superposed load and draft stresses imparted to the respective disc gangs.

As a means of enabling one or the other of the disc gangs to be thrown out of operation and causing the weight and draft stresses to be transmitted solely to the other gang as a single gang implement or soil pulverizer, one side or the other of the oscillatory gang frame may be hooked up or connected to the draft frame (in the form shown in Figs. 1 and 2 of the rear portion thereof) through the medium of suitable connecting elements, as for example,—a connecting link 13, provided with suitable projections or hooks 13$^a$, one end being adapted to extend through suitably located openings 6$^b$ in the gang frame yoke and the other end being adapted to be attached to the draft frame, as for example,—over the adjacent arm of the bracket 2, as shown in Fig. 2, or if desired through openings 6$^c$ in the bracket, as shown in Figs. 5, 6 and 7 of the drawings.

In the form shown in Fig. 5 of the drawings the adjusting slot 12$^a$ is transposed to the bearing head 2$^a$ of the draft frame bracket and the bearing cap 11 is transposed to the inner side of the bearing head of the bracket, the interlocking serrations 2$^c$ in such instance being on the adjacent inner side of such bearing head, as shown most clearly in Fig. 8 of the drawings.

In the form shown in Fig. 10 of the drawings the gang frame or yoke member 6 is provided with a longitudinally extending slot 12$^b$, extending in a common plane so that the adjustment of the pivot connections will be wholly horizontal or parallel with the common plane of the gang axes as distinguished from the angular shaped slots shown in Figs. 5, 6 and 7 of the drawings.

Having thus described some of the embodiments of the invention, without having attempted to set forth all the forms in which it may be made, or all the modes of its use, what we claim and desire to secure by Letters Patent is,—

1. In an implement of the class described, the combination of the draft frame, a supplemental frame carrying two transverse series of discs, and means for shifting and securing said supplemental frame in variable longitudinal oscillatory positions relative to said draft frame.

2. In an earthworking implement of the class described, a draft frame, a supplemental frame carrying two transverse series of discs and connected to the draft frame to oscillate around a horizontal axis and adjustable bodily transversely of said axis, and means for securing it under different adjustments.

3. In an earthworking implement of the class described, a draft frame, a supplemental frame carrying two transverse series of discs and adapted to be adjusted longitudinally of the draft frame, and means for securing it in either of several relative positions to the draft frame and adapted to permit it to oscillate vertically.

4. In an earthworking implement of the class described, a draft frame, a tool comprising two transverse gangs of discs both being normally freely movable vertically around a transverse axis, supports each connected to the adjacent ends of said gangs, and means for securing said tool to the draft frame at any one of several longitudinal positions.

5. In an earth working implement of the class described, a frame, a tool element comprising two transverse gangs of disks both being normally freely movable around an axis lying between the vertical planes of the gang axes, supports each connected to the adjacent axis of said gangs, said tool element being adjustable bodily longitudinally of the draft frame, and means for securing said support to the draft frame at any one of several positions.

6. In an earthworking implement of the class described, a draft frame, a supplemental frame carrying two transverse series of discs and connected to the draft frame to oscillate vertically around a horizontal axis in a transverse vertical plane between the transverse vertical planes through the axes of the discs, the connection for the supplemental frame being adjustable bodily forward and backward relatively to the main frame, and means for fastening it in different positions relatively to the axis.

7. In a tillage implement, including a transverse draft frame and front and rear parallel extending disc gangs, oscillatory bearing members connected to the ends of said disc gangs and to said draft frame, and means for adjusting and permitting the shifting of the points of oscillation of said yoke members to correspondingly shift the draft stresses imparted to the respective disc gangs through said draft frame.

8. In a tillage implement, including a transverse draft frame and front and rear parallel extending disc gangs, axle members for said disc gangs, oscillatory gang bearing yoke members connected to the ends of said gang axle members and to said draft frame, and means for adjustably connecting said yoke members to said draft frame for longitudinally shifting the points of oscillation of said yoke members relatively to said draft frame and in the line of draft to correspondingly shift the superposed weight upon the draft stresses imparted to said disc gangs through said yoke members and draft frame.

9. In a soil pulverizer, including a draft frame and front and rear loosely mounted disc gangs and axle members, oscillatory gang bearing members detachably connected to the ends of said axle members, means for longitudinally shifting and variably connecting said gang bearing members relatively to said draft frame and in the line of draft, and means whereby one set of said disc gangs may be held out of engagement with the soil and the weight and draft stresses transferred to the other as a single gang soil pulverizer.

10. In an implement of the roller pulverizer type, including a draft frame and front and rear loosely mounted disc gangs and axle members, oscillatory gang bearing members detachably connected to the ends of said axle members, means for connecting said bearing members to said draft frame for shifting of the same longitudinally in the line of draft and relatively to said draft frame to correspondingly shift the weight and points of oscillation between said draft frame and oscillatory gang bearing members, and means for connecting said gang bearing members to said draft frame whereby one of said disc gangs may be held out of operation and the weight and draft stresses transmitted to the other.

11. In an implement of the class described, a draft frame and front and rear disc gangs, a gange frame, means for flexibly connecting said gang frame to said draft frame to oscillate about a transverse axis, and means for variably connecting said gang frame to shift said transverse axis longitudinally whereby the weight and draft stresses may be transmitted in varying degrees to the respective disc gangs.

12. In an earth working implement, a draft frame, a gang frame carrying two transverse disc gangs movably connected to said draft frame to oscillate around a transverse axis below the plane of the axes of said disc gangs, and means for longitudinally shifting said axis of oscillation relatively of said draft frame and for variably transmitting the weight and draft stresses to the respective disc gangs.

13. In an implement of the class described, including a draft frame and front and rear disk gangs, gang yoke members connected to said disk gangs, means for pivotally connecting said gang yoke members to said draft frame below the plane of said gang axis, said means permitting the shifting and adjusting of said pivot connections longitudinally and relatively of said draft frame, and means whereby one of the disk gangs may be held out of operation and the weight and draft strains be transmitted to the other disk gang as a single gang implement.

14. In an earth working implement a draft frame, two transverse parallel extending disc gangs, a gang frame flexibly connected to said draft frame to oscillate around a horizontal axis located below the plane of the axes of said disc gangs, and means for longitudinally shifting said axis of oscillation in the line of draft and relatively to said draft frame and for transmitting the weight and draft stresses in varying ratios to the respective disc gangs.

In testimony whereof we have affixed our signatures.

WILEY J. DUNHAM.
RAY E. DUNHAM.